Sept. 20, 1971     A. BOUCKAERT     3,605,236
ASSEMBLING AND POSITIONING DEVICE FOR COAXIAL
ELECTRICAL CONTACTS
Filed Dec. 11, 1968     6 Sheets-Sheet 1
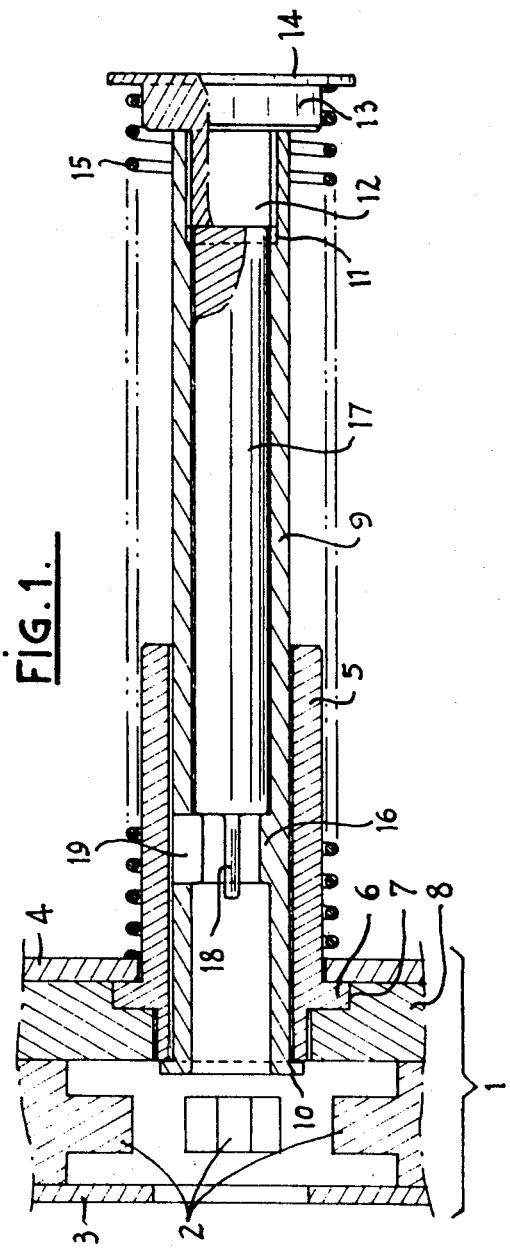
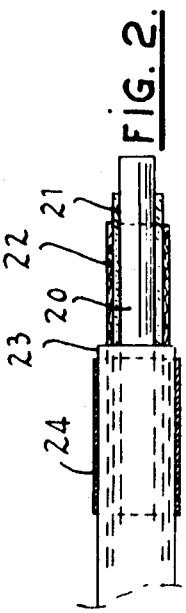
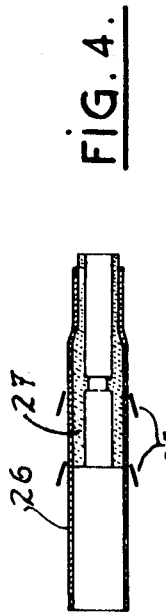

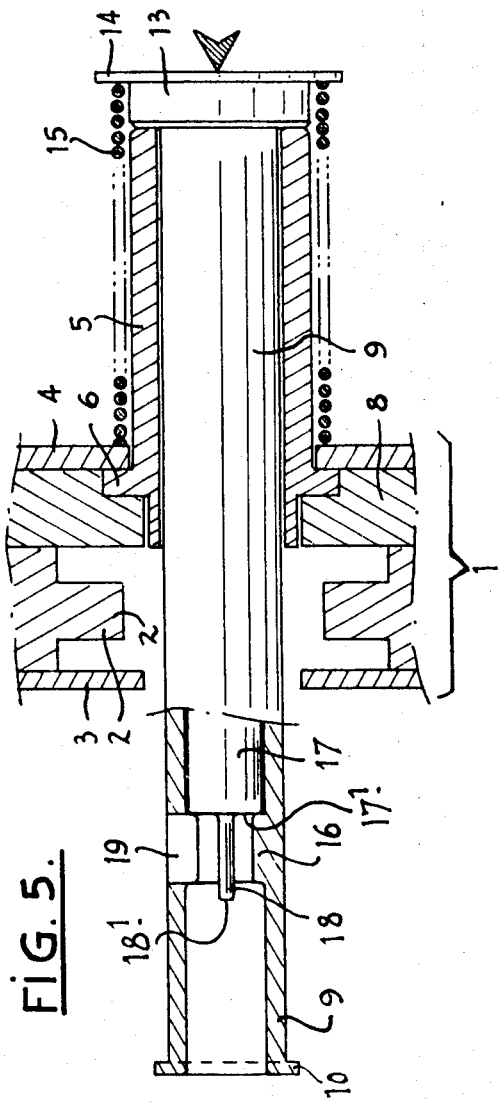
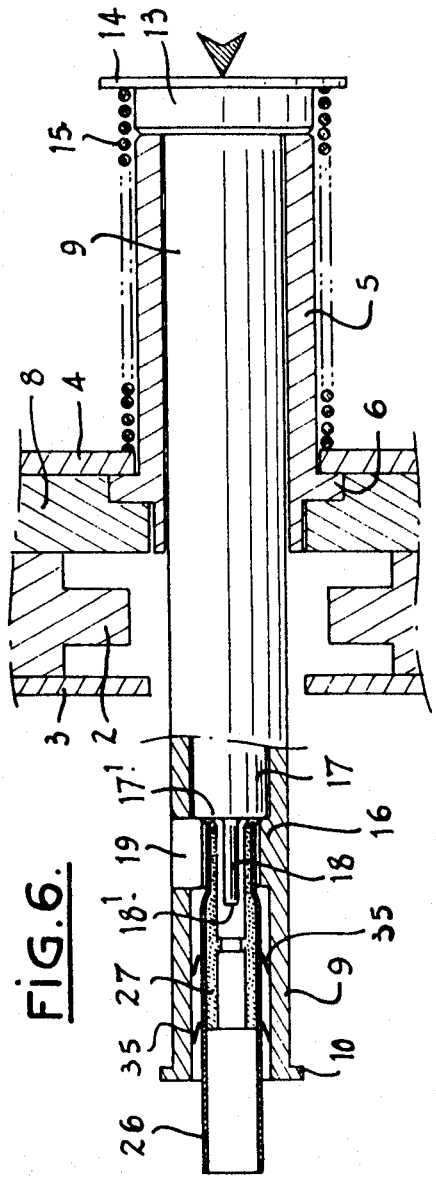
FIG.5.
FIG.6.

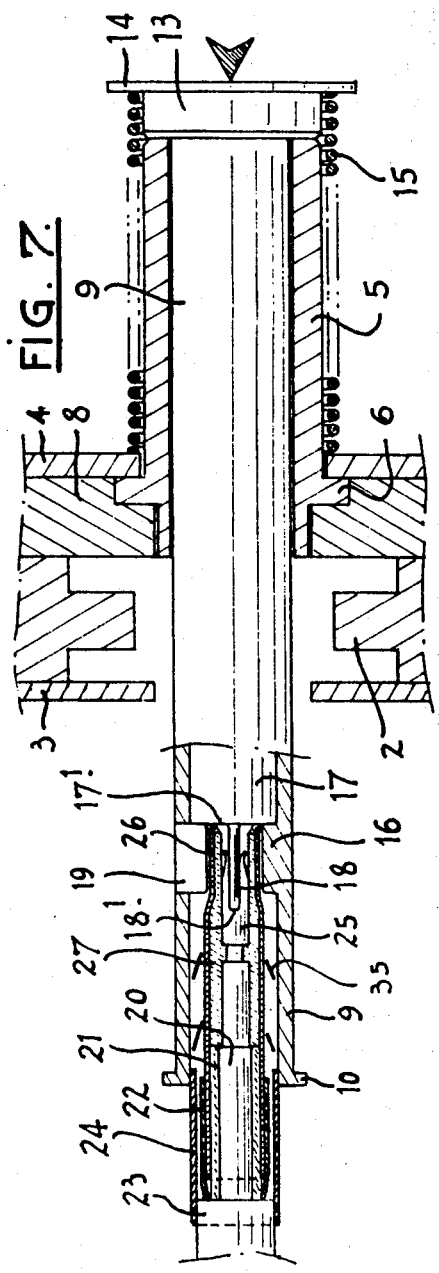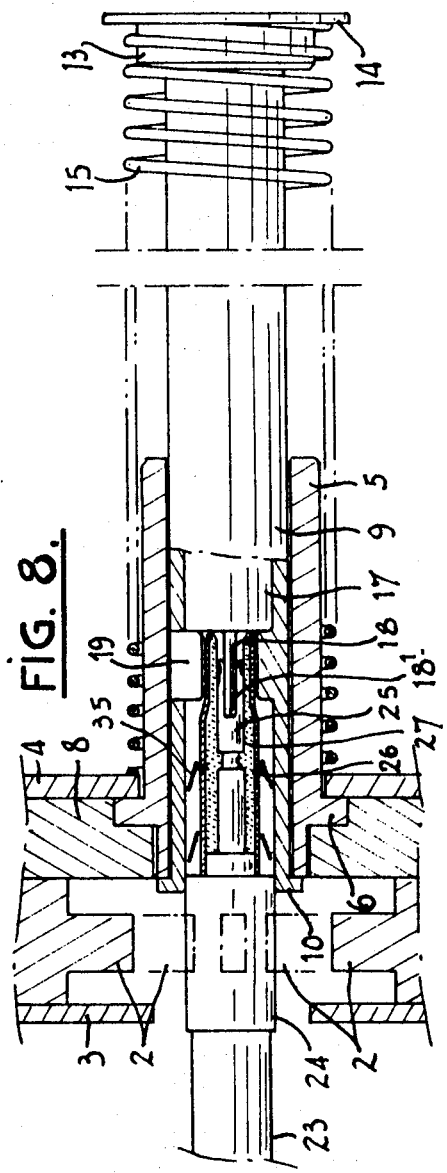

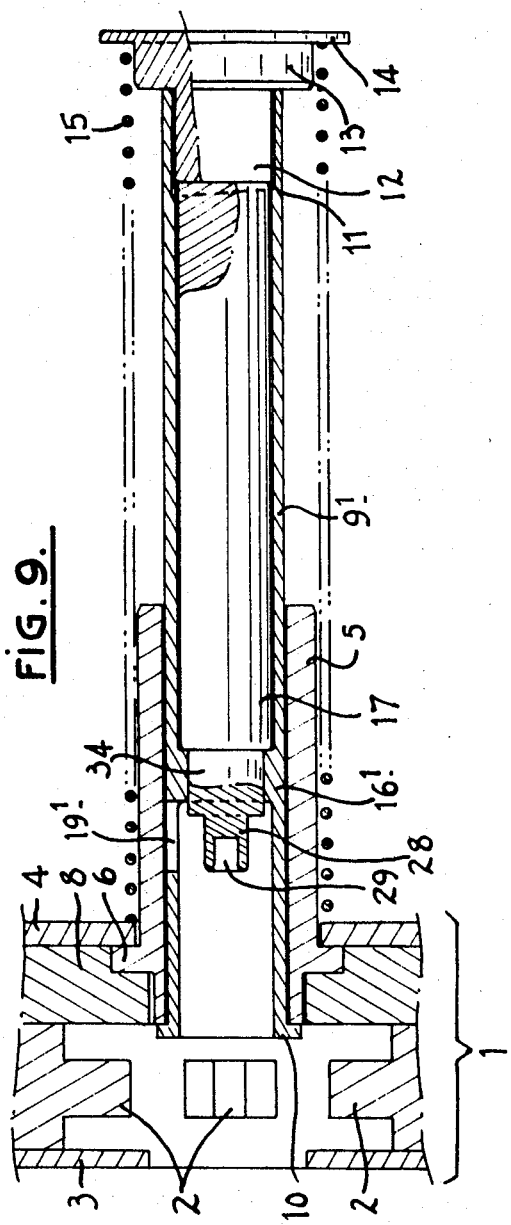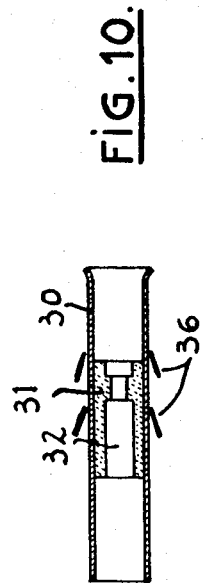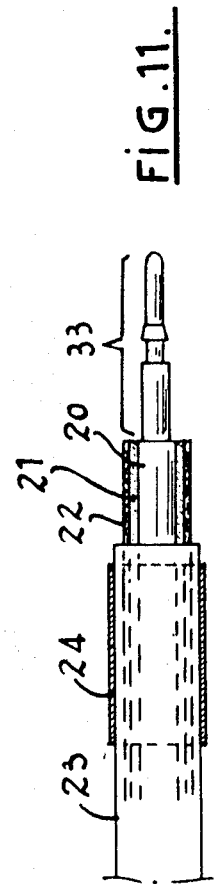

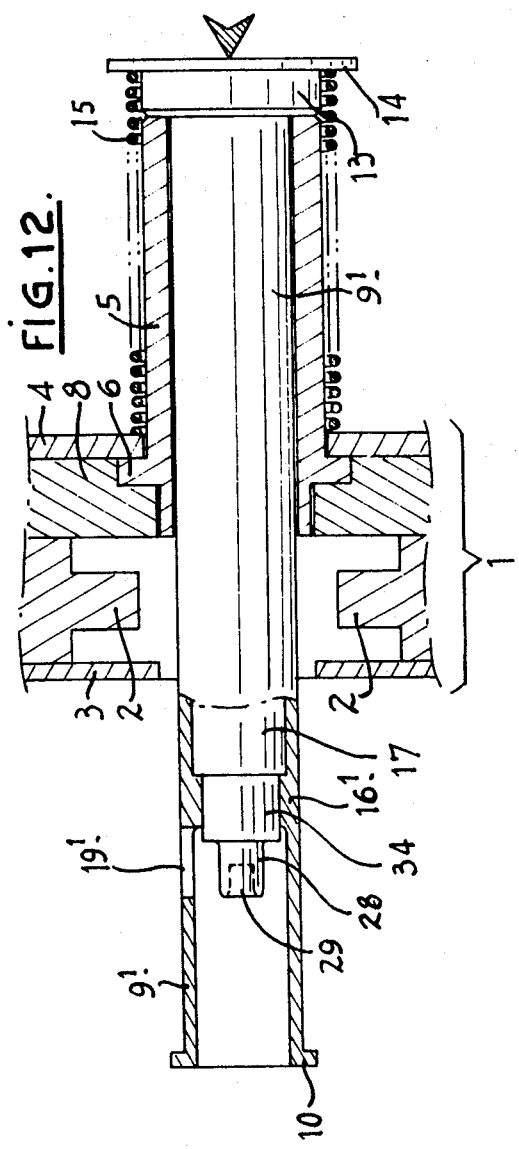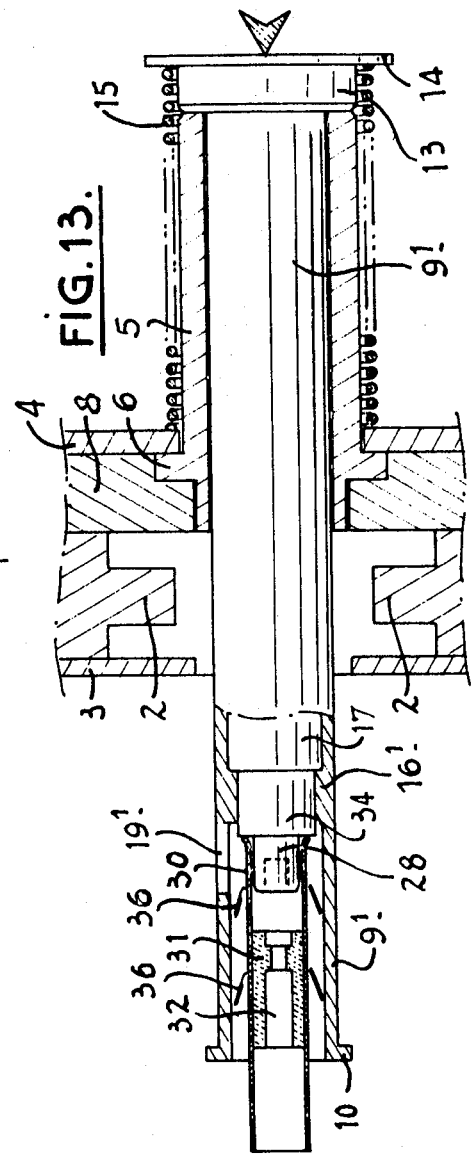

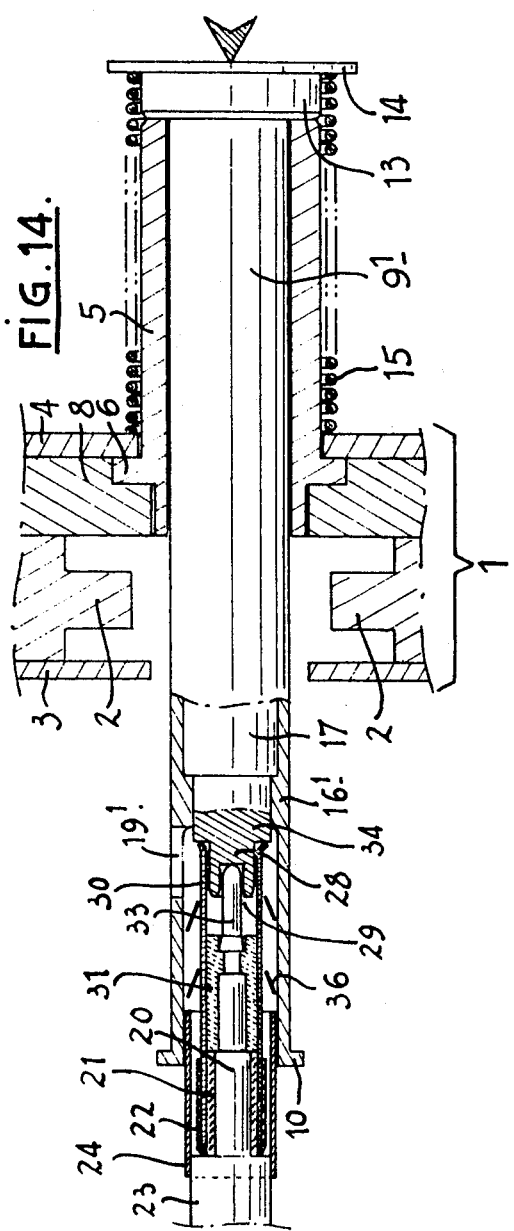
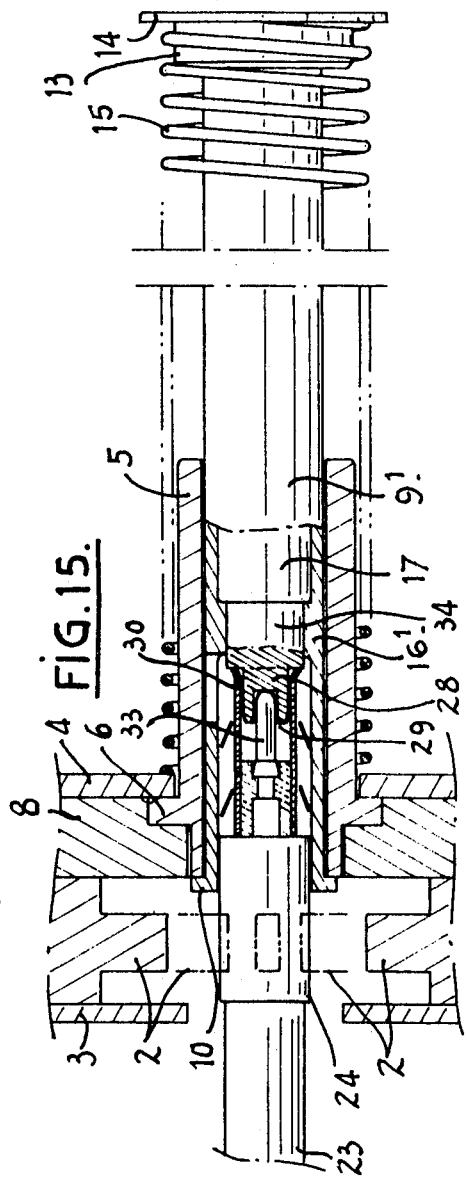

United States Patent Office 3,605,236
Patented Sept. 20, 1971

3,605,236
ASSEMBLING AND POSITIONING DEVICE FOR COAXIAL ELECTRICAL CONTACTS
Augustin Bouckaert, Oosterzele, Belgium, assignor to Burndy Corporation, Norwalk, Conn.
Filed Dec. 11, 1968, Ser. No. 782,967
Int. Cl. H01r 43/04; H05k 13/00
U.S. Cl. 29—203D
8 Claims

ABSTRACT OF THE DISCLOSURE

A device for positioning the inner and outer elements of a coaxial electrical contact assembly relative to one another, and for locating the assembled elements in proper position relative to a crimping die assembly. A tubular sleeve, fixed in position relative to a crimping device, serves as a guide for a slidable bushing which is spring-biased toward one end of the sleeve. Fixed, as well as removable, stop members within the bushing provide relative positioning for inner and outer contact elements which can be inserted coaxially into the bushing for assembly. A window aperture in the bushing wall permits visual examination for proper positioning, and the spring biasing allows displacement of the bushing between assembling and crimping positions.

This invention relates generally to assembly devices for assembling the component parts of coaxial electrical connectors. It has more specific reference to devices of this type which are adapted to carry the assembled component parts into a crimping die assembly in proper alignment.

In the prior art, the assembly and final mounting of coaxial electrical contacts generally is a manual operation. Individual operators are required to assemble manually the inner and outer parts of a coaxial connector, and then must arrange to hold the parts in proper relationship while they are compressed finally onto a proper conductor. As a result of these procedures the final relationship of the assembled parts, and the similarity in quality of successive connections, to a great extent depends on the ability of the operator.

Accordingly, it is an object of this invention to provide an assembly device for coaxial contacts which will locate parts by mechanical means to assure consistent positioning in successive connections.

It is a further object of this invention to provide an assembly device in which satisfactory operation will be substantially independent of the skill or judgment of an operator.

Another object of this invention is the provision of an assembling device which permits visual confirmation that contact elements are positioned properly prior to crimping.

And, still another object of this invention is the provision of an assembling device capable of transporting assembled parts to a crimping device in proper relationship and position for crimping.

These and other objects, features and advantages of this invention are described, claimed and illustrated in detail in the following specification, claims and drawings, in which:

FIG. 1 is a sectional view showing a device constructed in accordance with this invention, assembled to a crimper device (shown partially) and adapted for assembling inner female contact elements in combination with outer male contact elements;

FIG. 2 is a longitudinal sectional view of a coaxial conductor cable;

FIG. 3 illustrates the appearance of an inner female contact;

FIG. 4 illustrates the appearance of an outer male contact;

FIGS. 5 through 8 are views similar to FIG. 1, showing the parts of the device in various operating positions;

FIG. 9 is a view, similar to FIG. 1, of the device adapted for assembling inner male contacts in combination with outer female contacts;

FIG. 10 illustrates the appearance of an outer female contact;

FIG. 11 illustrates the appearance of an inner male contact assembled to the end of a coaxial conductor cable;

FIGS. 12 through 15 are views, similar to FIG. 9, showing the parts of the device in various operating positions.

Now, referring to the drawings in more detail, it may be seen that an apparatus according to the invention comprises a guide sleeve 5 which extends laterally in relation to the crimper device and which is provided at the end closer to the crimper with a flange 6 engaging in a recess 7 in an intermediate member 8 and bearing against the inside face of the end plate 4.

Displaceably mounted inside the guide sleeve 5 is a sliding assembly formed of a bushing 9, provided at the end nearer to the die with an abutment 10 adapted to come into contact with the guide sleeve 5, and formed at its other end with an internal screw thread 11. A plug 12 threaded into screw thread 11, is provided with a head 13 having a diameter substantially equal to that of the sleeve 5 and includes a peripheral ridge 14, between which and the end plate 4 there is provided a helical spring 15.

Inserted between an internal circular abutment 16 and the plug 12 is a cylindrical member 17, which is provided with a pin 18 at the end near the crimper assembly.

The bushing 9 is formed with a window aperture 19 coincident with the abutment 16.

FIG. 2 shows the end of a coaxial cable comprising an inner conductor 20 covered by insulation 21, on which there is situated a braiding 22, which constitutes the external conductor coaxial with the conductor 20, and provided in turn with insulation 23 around which there is situated a ferrule 24, which will hereinafter be referred to.

In FIG. 3, there is shown an electrical contact 25, which is adapted to be electrically connected to the internal conductor 20 and which constitutes an inside female contact.

FIG. 4 illustrates an outside male contact 26 provided with internal insulation 27 and with a retaining spring 35.

The operation of the illustrated embodiment of the invention is as follows:

On depression of the plug 13–14 (FIG. 5), the assembly composed of the bushing 9 and the cylindrical member 17, and the pin 18, is caused to slide within sleeve 5 and the spring 15 is compressed. The end of the assembly thus is brought outside the crimping die and the window 19 becomes visible.

The outside male contact 26–27 with the retaining spring 35 then is introduced into the bushing 9 and engages the forward face 17¹ of the cylindrical member 17 (FIG. 6). The position of the contact 26–27 thus is well defined and can be observed through the inspection window 19.

An inside female contact 25 which previously has been electrically connected to the inner conductor 20 then is introduced into the outside contact 26–27 until it abuts the end 18¹ of the pin 18 (FIG. 7). Thus, contact 25 is affirmatively positioned and moreover is perfectly centered on the axis of the outer contact 20 due to the positioning action of pin 18.

The ferrule 24 is positioned on the braiding 22 as illustrated in FIG. 7.

When these operations have been completed, the operator releases member 14, and the action of the spring 15 returns the sliding assembly 9, 17, into the position of FIG. 8, in which the abutment 10 comes into contact with the sleeve 5.

Then, the crimper is operated so as to crimp the ferrule 24 to the assembled contact elements and cable with the outside male contact and the inside female contact in their correct relative positions.

FIGS. 9 to 15 relate to the positioning and crimping of outside female contacts (FIG. 10) and inside male contacts (FIG. 11) which are intended to co-operate with the female contacts of FIG. 3 and the male contacts of FIG. 4 and which are designed for the coaxial cables of FIG. 2.

In this case, the positioning device of FIGS. 1 to 8 is adapted as shown in FIGS. 9 to 15, embodying still a guide sleeve 5 with a flange 6, a bushing $9^1$, a cylindrical member 17, a spring 15, a plug 12 with the head 13 and the peripheral ridge 14.

The bushing $9^1$ is formed with an aperture $19^1$ which is situated in front of the circular abutment $16^1$ close to the crimper, while the cylindrical member 17 is terminated at the crimper end by a cylindrical end 28 formed with a cavity 29.

The outside female contact of FIG. 19 comprises a ferrule 30 having on its inside an insulating portion 31 formed with a bore 32 and a retaining spring 36.

The inside female contact 33 is electrically connected to the inner cable conductor 20 covered with the insulation 23, on which is situated the braiding 22, which constitutes the outer cable conductor disposed coaxially with inner conductor 20 and provided in turn with insulation 23 around which the ferrule 24 is situated.

The operation is as follows:

When the plug 13–14 is advanced by an operator, the assembly composed of the bushing $9^1$, of the cylindrical member 17 and of the cylindrical end member 28 is caused to slide within sleeve 5, and the spring 15 is compressed. The end of this assembly thus is brought outside the die and the window $19^1$ becomes visible.

The outside female contact 30 then is positioned on the end member 28 (FIG. 13) and abuts a narrowed portion 34 of the cylindrical member 17. The position of the contact 30 is defined clearly and may be observed through the window $19^1$.

The inside male contact 33 which has been electrically connected to the cable is introduced into the outside contact 30–31 until it abuts the end of the cavity 29. The contact 33 has a very accurate position in relation to the outside contact 30 and in addition is centered perfectly on the axis of the latter.

The furrule 24 is placed on the braiding 22 (FIG. 14).

When these operations have been completed, the operator removes the pressure from the member 14, and the action of the spring 15 returns the sliding assembly into the position of FIG. 15, in which the abutment 10 comes into contact with the sleeve 5.

The crimper is operated so as to crimp the ferrule 24 onto the coaxial contacts and to maintain the outside and inside female and male contacts respectively in their relative positions.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appended claims, and by means of which objects of this invention are attained and new results accomplished, as it is obvious that the particular embodiments herein shown and described are only some of the many that can be employed to obtain these objects and accomplish their results.

I claim:

1. A device for assembling and positioning coaxial male and female contacts for crimping between a pair of relatively movable dies in a crimping assembly, characterized by a guide sleeve fixed to the crimping assembly and extending laterally in relation to the direction of motion of the dies;

a displaceably mounted sliding assembly formed of a bushing disposed within said sleeve;

a cylindrical member disposed within said bushing and having at the end closer to the dies means for positioning contacts inserted into said sliding assembly;

wherein the said bushing is formed with a window aperature therein in such manner that the end of the sliding assembly can be brought into a first position in which the window is visible outside the guide sleeve to permit observation of the position of contacts within said sliding assembly;

said device being further characterized by resilient means acting upon said sliding assembly relative to said guide sleeve, urging said sliding assembly into a given position, and by abutment means on said bushing interacting with said guide sleeve to limit relative motion therebetween at said given position.

2. A device according to claim 1, further characterized in that the said bushing is provided at the end closer to the dies with an abutment which is adapted to come into contact with the guide sleeve when said sliding assembly has been moved to a second position relative to said sleeve.

3. A device according to claim 1, further characterized in that there is provide at the end of said sliding assembly remote from the dies, a plug engaged in the said bushing having a peripheral ridge of diameter greater than said sleeve, between which peripheral ridge and the said crimping assembly there is provided a compression spring substantially coaxial with said sleeve.

4. A device according to claim 3, further characterized in that the said cylindrical member is captured between an inner circular abutment, formed within said bushing, and the said plug.

5. A device according to claim 4, further characterized in that, for the positioning of an outside male contact in combination with an inside female contact, the said cylindrical member is provided with a positioning pin to engage an inside female contact and said window is formed coincident with the circular abutment.

6. A device according to claim 5, further characterized in that in the said first position in which the said window of said bushing is visible, an outside male contact introduced in to the bushing will engage a forward face of the said cylindrical member, and an inside female contact introduced into the outside contact will engage the proximate end of the said pin.

7. A device according to claim 4, further characterized in that, for the positioning and crimping of outside female contacts in combination with inside male contacts, the said cylindrical member is terminated at the end closer to the crimping assembly by a cylindrical end member formed with a cavity; and the said window is situated between the said inner circular abutment and the end of said bushing nearer to the said crimping assembly.

8. A device according to claim 7, further characterized in that, in the said second position of said sliding assembly, an outside female contact inserted into said bushing will engage the end of said cylindrical member and an inside male contact introduced into the outside female contact will enter into the said cavity.

References Cited

UNITED STATES PATENTS 3,484,921    12/1969    Ziegler, Jr. _____ 29—203H

THOMAS H. EAGER, Primary Examiner

U.S. Cl. X.R.

29—203H